United States Patent Office 3,370,020
Patented Feb. 20, 1968

3,370,020
PROCESS FOR THE PRODUCTION OF PHOSPHO-NITRILIC POLYMERS AND POLYMERS PRODUCED THEREBY
Harry Rex Allcock, Darien, and Robert Louis Kugel, South Norwalk, Conn., assignors to American Cyanamid Company, Stamford, Conn., a corporation of Maine
No Drawing. Filed Sept. 29, 1964, Ser. No. 400,222
6 Claims. (Cl. 260—2)

ABSTRACT OF THE DISCLOSURE

This invention relates to a novel process for the production of phosphonitrilic polymer mixtures. More particularly, this invention relates to a novel process for the production of phosphonitrilic polymer mixtures which comprises forming a polymer mixture from a phosphonitrilic trimer or tetramer, reacting the resultant polymer mixture with an alkali metal or alkaline earth metal compound to form a phosphonitrilic ester mixture, and then fractionally precipitating the resultant polymeric ester mixture so as to precipitate the high polymer mixture therefrom. Still more particularly, this invention relates to novel phosphonitrilic polymer mixtures which are thermally stable, water-resistant and which will not undergo hydrolysis when contacted with water at high temperatures.

---

Phosphonitrilic polymers and methods for their preparation have been extensively disclosed and examined in the prior art, see for example, U.S. Patent Nos. 2,876,247 and 2,866,773. The products produced by methods shown in the prior art, however, are not of sufficiently high molecular weight or thermal stability so as to enable their usage in many fields, such as the manufacture of electrical equipment casings. Additionally, the products shown in the prior art are generally cross-linked and contain large amounts of unreacted chlorine thereby causing hydrolysis of the polymers on contact with water at high temperatures, i.e., about 100° C.

We have now found that phosphonitrilic polymer mixtures can be produced utilizing our novel method, and thermally stable, water-resistant articles of manufacture which are not hydrolyzed by water, i.e., are chlorine free can be formed therefrom. That is to say we have discovered a novel method for the production of clear, white, solid, chlorine-free polymer mixtures which are thermally stable and water-resistant and which may be utilized in many applications for which the products of the prior art have been shown to be inapplicable.

It is therefore an object of the present invention to provide a novel process for the production of phosphonitrilic polymer mixtures.

It is a further object of the present invention to provide a novel process for the production of phosphonitrilic polymer mixtures which comprises thermally polymerizing a phosphonitrilic trimer or tetramer to produce a polymer mixture, reacting the resultant polymer mixture with an alkali metal or alkaline earth metal compound to produce a polymeric ester mixture and then fractionally precipitating said ester mixture to produce a high molecular weight, thermally stable, water-resistant, chlorine-free polymer mixture.

It is a further object of the present invention to provide high molecular weight phosphonitrilic polymer mixtures which are clear, white, solid, chlorine-free and water-resistant.

These and other objects will become more apparent to one skilled in the art upon reading the more detailed description of the present invention set forth hereinbelow.

The novel process

As mentioned above, we have discovered a novel process for the production of phosphonitrilic polymer mixtures. Our process is composed of a plurality of steps, the first of which comprises thermally polymerizing a compound having the formula (I) $\quad (NPCl_2)_m$ wherein $m$ is 3 or 4, under various critical reaction conditions. The compounds are polymerized by heating them at a temperature and for a length of time ranging from about 200° C. for 48 hours to 300° C. for 30 minutes. That is to say, the compounds are heated to a temperature ranging from about 200° C. to about 300° C. for from about 30 minutes to 48 hours, the higher temperatures necessitating a shorter contact times and the lower temperatures necessitating longer contact times. The compounds must be heated for such a length of time that only a minor amount of unreacted charge material remains and a major amount of high polymer has been produced. Such a result is generally achieved by following the conditions of temperature and contact time specified above.

As is clear from Formula I, the charge materials to our novel process may be the trimer or tetramer of phosphonitrilic chloride. Mixtures of trimer and tetramer may also be used however. The starting materials must be substantially pure, i.e., they must contain not more than about 1% impurity, such as water, for example. If the starting materials contain more impurity than mentioned above, the reaction is virtually uncontrollable and the polymerization will proceed to conclusion and result in cross-linked insoluble products. We have found that the polymerization must be terminated before gelation of the polymer occurs. Such termination can be achieved by cooling the reaction media, adding a polymerization inhibitor, etc. It is critical that little or no gelation occurs during the polymerization since the cross-linked polymer which results upon gelation is inapplicable for use in the further steps of our novel process. Purification of the starting material to within the limits mentioned above, can be effected, e.g., by recrystallization from heptane. Any known technique may be utilized to determine approximately when gelation is due to occur. The most accurate indication of approaching gelation can be attained from the viscosity of the polymeric media. As the viscosity of the polymeric media increases, the time for gelation rapidly nears and the polymerization must be terminated. Since it is very difficult to measure the exact viscosity at the temperature of reaction of the reaction media, the termination point is either a matter of reference to a previous polymerization under the same set of conditions or a matter of visually observing the consistency of the media undergoing polymerization. We have found that one effective method is to place a glass ball of one-half inch diameter in the polymerization vessel. The polymerization is then terminated at or before the time the glass ball ceases to flow in the reaction media when the reactor is inverted. It should be stressed however that the reaction should not be terminated at least until the conditions of time and temperature, set forth above, have been met.

It is preferred that the thermal polymerization be carried out in the presence of an inert gas such as nitrogen, neon, argon or a vacuum inasmuch as the reaction proceeds very slowly in the presence of air. The use of such a gas, however, is not critical.

The polymers resulting from the thermal polymerization portion of our novel process are in the form of a polymeric mixture of different polymers of different chain lengths. That is to say, the product of the thermal polymerization is a mixture of polymers having the formula (II) $\quad (NPCl_2)_n$ wherein $n$ ranges from about 5 to about 1500. For example, the recovered media may contain minor amounts of a polymer where $n$ is 5, i.e., five recurring units of Formula II, and major amounts of polymer where $n$ is 1500, i.e., fifteen hundred recurring units of Formula II. The media may also contain polymers composed of from 6-1499 recurring units of Formula II, the complete mixture of polymers constituting the charge to the second step of our process.

The second step of our novel process comprises treating the polymer mixture resulting from the thermal polymerization step with a compound having the formula (III)  $\qquad M(OR)_x$ wherein M is lithium, sodium, potassium, magnesium or calcium, $x$ is equal to the valence of metal M, and R is an alkyl radical having from 1–8 carbon atoms, inclusive, an aryl radical having from 6–10 carbon atoms, inclusive, a substituted alkyl radical or a substituted aryl radical, the substituents being halogen, nitro, cyano, alkoxy, ($C_1$–$C_4$) or aryloxy, ($C_6$–$C_{10}$) radicals. The polymer mixture is reacted with the metal compound at a temperature and a length of time ranging from about 25° C. for 7 days to about 200° C. for 3 hours.

Again, as in regard to the polymerization step mentioned above, the polymer mixture is reacted with the alkali or alkaline earth metal compound at a temperature ranging from about 25° C. to about 200° C. for from about 3 hours to 7 days, the lower temperatures necessitating the longer reaction times and the higher temperatures allowing shorter reaction times. These conditions are, of course, utilized in order to obtain the most complete reaction possible, i.e., in order to insure the complete conversion of the chlorine atoms in the polymer mixture to the corresponding ester of the alkali or alkaline earth starting material.

The solvent employed in the esterification step of our process and the alkali or alkaline earth metal compound must be substantially anhydrous, i.e., there must be no more water in the solvent or metal compound than will result in more than 1%, by weight, of water in the reaction mixture. The prevention of water in the system is necessary in order to inhibit the reaction of the available chlorine atoms in the polymer therewith.

Either the polymer mixture or the alkaline earth (or alkali) metal compound may be used as a solvent solution thereof in an inert, organic solvent. It is preferred, however, that at least one of the charge materials be used as a solution in a compound which is a solvent for the polymeric mixture. Any inert solvent may be used for this purpose with such compounds as the aromatic hydrocarbons, i.e., benzene, toluene and the like, diethyl ether, tetrahydrofuran, dioxane and the like, being exemplary. The amount of solvent employed is not critical and any amount sufficient to solubilize the chloride polymer mixture can be employed.

The amount of alkali metal or alkaline earth metal compound employed should be at least molecularly equivalent to the number of available chlorine atoms in the polymer mixture. However, it is preferred that an excess of the metal compound be employed in order to assure complete reaction of all the available chlorine atoms.

Examples of alkali or alkaline earth metal compounds which are represented by Formula III and therefore are, of necessity, useful in the process of the present invention include sodium methoxide,
sodium octyloxide,
lithium methoxide,
lithium octyloxide,
potassium methoxide,
potassium octyloxide,
magnesium methoxide,
magnesium octyloxide,
calcium methoxide,
calcium octyloxide,
sodium phenoxide,
sodium-1-naphthoxide,
lithium phenoxide,
lithium-1-napthoxide,
magnesium phenoxide,
magnesium-2-naphthoxide,
potassium phenoxide,
potassium-2-naphthoxide,
calcium phenoxide,
calcium-1-naphthoxide,
sodium chloromethoxide,
sodium o-, m- or p-chlorophenoxide,
lithium chloromethoxide,
lithium o-, m- or p-chlorophenoxide,
potassium chloromethoxide,
potassium,
o-, m- or p-chlorophenoxide,
calcium chloromethoxide,
calcium, o-, m- or p-chlorophenoxide,
magnesium chloromethoxide,
magnesium, o-, m- or p-chlorophenoxide,
sodium-3-chlorooctyloxide,
sodium-3-chloro-1-naphthoxide,
potassium-2-chlorooctyloxide,
lithium-4-chloro-2-naphthoxide,
calcium-6-bromooctyloxide,
calcium-2-bromo-1-naphthoxide,
magnesium-8-iodooctyloxide,
potassium-5-fluoro-1-naphthoxide,
lithium-5-fluoro-octyloxide,
magnesium-6-iodo-2-naphthoxide,
sodium bromomethoxide,
sodium iodomethoxide,
magnesium fluoromethoxide,
potassium-2-bromoethoxide,
lithium-2-iodopentoxide,
calcium-7-fluorooctyloxide,
sodium nitromethoxide,
sodium-8-nitrooctyloxide,
lithium o-, m- or p-nitrophenoxide,
calcium-3-nitro-1-naphthoxide,
potassium cyanomethoxide,
magnesium-4-cyanohexoxide,
lithium methoxymethoxide,
sodium o-, m- or p-nitrophenoxide,
lithium-2-cyano-1-naphthoxide,
magnesium o-, m- or p-cyanotolyloxide,
calcium-3-fluoroxyloxide,
magnesium o-, m- or p-n-butoxyphenoxide,
sodium-3-t-butoxyoctyloxide,
calcium phenoxymethoxide,
sodium o-, m- or p-phenoxyphenoxide,
calcium-3-phenoxy-1-naphthoxide,
lithium-2-napthoxyethoxide,
sodium ethoxide,
sodium-1,1,1-trifluoroethoxide,
sodium-1,1,1,2,2-pentafluoropropoxide,
calcium ethoxide,
lithium propoxide,
potassium n-butoxide,
potassium o-, m- or p-methoxyphenoxide,
sodium o-, m- or p-benzyloxide, and the like.

The second step of our novel process results in the production of a polymer mixture having the formula (IV)  $\qquad [NP(OR)_2]_n$ wherein $n$ and R are as specified above in regard to Formulae II and III.

The polymeric reaction mixture resulting from the second or esterification step is then treated to remove the salt which results upon reaction of the chlorine atoms of the polymer mixture with the metal of the alkali or alkaline earth metal compound. The salt can be removed by merely precipitating it out and filtering, or it may be removed by any other applicable method, such as by washing the reaction mixture with water after neutralization thereof with, for example, an acid such as hydrochloric acid.

The next step in our novel process comprises fractionally precipitating the polymeric material represented by Formula IV to separate out the high polymer from the low polymer. The fractional precipitation is achieved by the, preferably dropwise, addition of the esterified polymer mixture to a material which is a non-solvent for the high polymer and a solvent for the low polymer. That is to say, any material which is a non-solvent for the polymers wherein $n$ is higher than 350 and a solvent for the remaining low polymers may be used to fractionally precipitate the desired polymers. Examples of materials which can be used for this purpose include heptane, benzene, diethyl ether, carbon tetrachloride, chloroform, dioxane and the like. The fractional precipitation of the esterified polymeric mixture generally should be carried out at least twice and preferably at least four times in order to remove as much of the low polymer from the polymer mixture as possible. The precipitation may be conducted at any temperature, however, it is preferred that room temperature be employed, since higher temperatures tend to increase or decrease the activity of the material used as the solvent. The novel high molecular weight polymer mixture may then be recovered by filtration, centrifugation, decantation or the like. The recovered polymer mixture is then preferably redissolved in a suitable solvent, such as acetone, filtered and re-precipitated as above to effect a further purification thereof.

*The novel polymeric mixtures*

The novel polymeric mixtures of our invention, as mentioned above, are very thermally stable and water-resistant. The mixtures may be represented by the formula (V) 

wherein $y$ is at least 350 and R is as mentioned above, in regard to Formula III. The polymeric mixtures are soluble in specific organic solvents, such as ethyl acetate, acetone and the like and are clear, white, solid elastomer. Evidence of the thermal stability thereof can be obtained from the fact that the mixtures have a $T_{10}$ value of at least 300° C., said temperature being defined as that at which a 10% weight loss occurs upon heating the polymeric mixtures so as to increase the temperature thereof 10° C. per minute. The polymeric mixtures are water-resistant at room temperature and do not undergo hydrolysis at high temperatures.

The polymeric mixtures may be used in the formation of films, fibers, coatings, molding compositions and the like. They may be blended with such additives as anti-oxidants, ultraviolet light absorbers, lubricants, plasticizers, dyes, pigments, other resins, etc., without detracting from the scope of the present invention.

The following examples are set forth for purposes of illustration only and are not to be construed as limitations of the present invention except as set forth in the appended claims. All parts and percentages are by weight unless otherwise indicated.

EXAMPLE 1

Two hundred parts of phosphonitrilic chloride trimer, previously recrystallized from n-heptane, are degassed and sealed in a suitable, thick-walled reaction vessel and heated to 250° C. for 4 hours. Polymerization is terminated at this time since a glass ball, one-half inch in diameter ceased to flow, due to the increased viscosity of the molten mass, when the vessel is inverted. Termination is effected by cooling the vessel to room temperature. The resulting polymeric mixture is then dissolved in 1000 parts of dry benzene. A solution of sodium 1,1,1-trifluoroethoxide is prepared by the slow eddition of 81.7 parts of sodium to 355 parts of 1,1,1-trifluoroethanol in 1500 parts of diethylether. A further 35.5 parts of 1,1,1-trifluoroethanol are added to complete the reaction. This solution is then added dropwise to the stirred polymer mixture solution and the resulting mixture is stirred and refluxed for 14 hours and stirred at 25° C. for 40 hours. The mixture is then neutralized with concentrated hydrochloric acid and the solids are filtered off, washed with methanol and water and dried. The residue is a polymer mixture. It is dissolved in acetone, filtered through a fritted filter disc, and precipitated into benzene. This procedure is repeated twice.

The final purified polymer mixture is a flexible, white solid with a softening point of 243° C. and a crystalline melting point of 238° C. The glass transition temperature is 18° C., and the $T_{10}$ value is 405° C., in air and 420° C. in nitrogen. The intrinsic viscosity, in acetone at 30° C., is 1.92 dl./g. and the molecular weight, by osmotic pressure, is 90,000. The infrared spectrum shows a peak at 1265 cm.$^{-1}$ which is indicative of $P=N$ bonding, while the nuclear magnetic resonance $P^{31}$ spectrum shows a single peak at +8.9 p.p.m. This is consistent with a linear, phosphonitrilic polymer structure. X-ray diffraction photographs show that the polymer mixture is crystalline. Analysis: Theory for $PNO_2F_6C_4H_4$: C, 20.6; H, 1.65; N, 5.77; P, 12.76; F, 46.9; Cl, 0. Found: C, 20.28; H, 1.95; N, 5.73; P, 12.99; F, 47.21; Cl, 0.

The polymer mixture is soluble in acetone, tetrahydrofuran, ethylacetate, ethylene glycol dimethyl ether, and methyl ethyl ketone. It is insoluble in diethyl ether, dioxane, ethanol, aromatic and aliphatic hydrocarbons, carbon tetrachloride, chloroform, dimethylformamide, dimethylsulfoxide, pyridine and acetonitrile. The polymer mixture is then cast to a tough, transparent film from a solution in acetone. The film is flexible, does not burn, and is water-repellant.

EXAMPLE 2

Two hundred parts of heptane-recrystallized phosphonitrilic chloride trimer are sealed, in vacuum, in a suitable reaction vessel and polymerized at 250° C. for 2.5 hours. The polymerization is terminated as in Example 1, the same glass ball technique being used. A solution of sodium methoxide is prepared by the addition of 81.7 parts of sodium to 117 parts of methanol; followed by dilution of the mixture with 600 parts of methanol. This solution is then added dropwise to a stirred solution of the phosphonitrilic polymer mixture in 2000 parts of dry benzene. The resulting mixture is heated to reflux for 16 hours and stirred at room temperature for 2 days. Hydrochloric acid is then added to neutralize the excess sodium methoxide, and the mixture is then evaporated to dryness on a rotating evaporator. The extract is washed with diethyl ether to partially remove low molecular weight polymers, and the residue is extracted with methanol. The methanolic solution is then added dropwise to an excess of diethyl ether and the high molecular weight polymer mixture is precipitated and filtered off. This procedure is then repeated. The purified polymer mixture is white and tacky (15 parts by weight of starting material). Analysis shows the absence of chlorine.

EXAMPLE 3

Phosphonitrilic chloride trimer is recrystallized from warm n-heptane to yield a product which melts at 114.5° C. Two hundred parts of this material are then sealed, in vacuum, in a suitable reaction vessel which is then heated at 250° C. until the viscosity increases to a point which visually indicates that gelation is imminent. This occurs at 4½ hours reaction time. The vessel is then cooled, opened and the contents dissolved in 1500 parts of benzene, the latter having been dried previously over calcium hydride. A solution of sodium phenoxide is then prepared by the slow addition of 92 parts of sodium to 376 parts of phenol in 2000 parts of tetrahydrofuran. This mixture is then added dropwise over 3 hours to the solution of phosphonitrilic chloride polymer mixture. The resulting mixture is then stirred and refluxed for 3 days, during which time a white precipitate of sodium chloride is formed. Tetrahydrofuran is removed by distillation. When the mixture becomes excessively viscous, dry benzene is added to maintain the fluidity. The mixture is then allowed to cool to room temperature and is filtered to remove sodium chloride, and the filtrate is carefully neutralized with aqueous hydrochloric acid, and washed with water to remove salts and residual tetrahydrofuran. The phenoxy-phopshonitrilic polymer mixture is then precipitated by the dropwise addition of the benzene solution to a large excess of n-heptane. The product is a mixture of phenoxy-phosphonitrilic polymers $[NP(OC_6H_5)_2]_n$ where $n$ ranges between 5 and 1500. The lower polymers are separated from the higher polymers by dropwise precipitation of a benzene solution of the polymer mixture into a benzene-heptane mixture.

The yield of high polymer mixture is 30%. The product is a colorless, elastic resin, insoluble in water and ethanol, but soluble in benzene, chloroform and dimethylformamide. The $T_{10}$ value of this polymer is 400° C. It is totally unaffected by boiling water. The glass transition temperature is 6° C. The reduced specific viscosity in dimethylformamide in 0.1 dl./g. and the molecular weight, determined by light scattering, is 70,000. Analysis shows the absence of chlorine.

Following the procdures of Examples 1–3, various other alkali metal and alkaline earth metal compounds are reacted with various polymer mixtures produced as described herein. The properties of the resultant polymer mixtures are set forth in Table I below. The conditions of polymerization and esterification are also varied in each example.

1000 parts and precipitated dropwise into 5000 parts of ethyl alcohol. The precipitation procedure is conducted a second time with the recovery of 180 parts of a mixture of insoluble polymers which, when dried at 100° C., results in a clear, tan elastomer. Upon analysis, the resulting polymeric mixture is found to contain 5.46% of chlorine. The phenoxy polymer mixture hydrolyzes when contacted with water at about 100° C.

EXAMPLE 19

(*Comparative*)

200 parts of phosphonitrilic chloride trimer, previously recrystallized from n-heptane, are degassed for 2 hours and sealed in a suitable reaction vessel. The contents are heated to 200° C. for 23 hours and polymerization is then terminated utilizing the glass ball technique described in Example 1. The resulting polymer mixture is soluble in most organic solvents. 29 parts of the resulting polymeric mixture are then dissolved in 700 parts of dry benzene and to the resulting solution are then added 47 parts of phenol and 51 parts of triethylamine. The mixture is then refluxed for 48 hours, cooled to room temperature and filtered to remove the triethylamine hydrochloride. The resulting benzene filtrate is then added dropwise to 5000 parts of ethyl alcohol to precipitate the insoluble polymer mixture. The precipitated polymer mixture is recovered by filtration and dried at 100° C. The resulting mixture is insoluble in most organic solvents, i.e., is cross-linked, and contains 18.55% of chlorine. Upon contacting the phenoxy polymeric mixture with water at about 100° C., hydrolysis results.

EXAMPLE 20

(*Comparative*)

Following the procedure of Example 18, 200 parts of re-

TABLE I

| | Polymerization Conditions | | | Esterification Conditions | | | Precip. Agts. (Non-Solvents) | Percent [2] | $T_{10}$ | | S.P., °C. | $H_2O$ Effect | M.W. | Percent Cl [3] |
|---|---|---|---|---|---|---|---|---|---|---|---|---|---|---|
| Ex. | Temp., °C. | Time, hr. | Term. as per Ex. No.[1] | Temp., °C. | Time, hr. | M—O—R | | | Air | $N_2$ | | | | |
| 4 | 250 | 4 | 1 | 200 | 3 | LiOC$_8$H$_{17}$ | Diethyl ether | 32 | 400 | 440 | 100 | None | 80,000 | 0 |
| 5 | 260 | 2 | 1 | 175 | 5 | Ca(OC$_3$H$_6$Br)$_2$ | Benzene | 35 | 410 | 425 | 150 | ..do.. | 90,000 | 0 |
| 6 | 220 | 16 | 1 | 150 | 8 | KO-2-NO$_2$-1-C$_{10}$H$_6$ | n-Heptane | 28 | 405 | 420 | 120 | ..do.. | 75,000 | 0 |
| 7 | 230 | 8 | 3 | 125 | 12 | Mg(OCH$_2$OCH$_3$)$_2$ | ..do.. | 39 | 400 | 425 | 215 | ..do.. | 77,000 | 0 |
| 8 | 245 | 5 | 1 | 60 | 48 | NaO-p-ClC$_6$H$_5$ | ..do.. | 41 | 390 | 415 | 60 | ..do.. | 70,000 | 0 |
| 9 | 300 | ½ | 3 | 25 | 168 | KO-1-C$_{10}$H$_7$ | ..do.. | 27 | 420 | 450 | 240 | ..do.. | 100,000 | 0 |
| 10 | 200 | 48 | 1 | 160 | 6 | Mg(OC$_4$H$_8$CN)$_2$ | Diethyl ether | 33 | 410 | 430 | 230 | ..do.. | 85,000 | 0 |
| 11 | 210 | 24 | 1 | 85 | 24 | LiOCH$_2$OC$_6$H$_5$ | n-Heptane | 31 | 400 | 430 | 215 | ..do.. | 82,000 | 0 |
| 12 | 240 | 6 | 1 | 175 | 5 | NaOC$_6$H$_4$OCH$_3$ | ..do.. | 26 | 380 | 400 | 220 | ..do.. | 67,000 | 0 |
| 13 | 250 | 3½ | 3 | 40 | 96 | Ca(OC$_8$H$_{16}$OC$_4$H$_9$)$_2$ | ..do.. | 35 | 400 | 410 | 90 | ..do.. | 70,000 | 0 |
| 14 | 280 | 1 | 1 | 75 | 30 | KO-m-CNC$_6$H$_5$ | ..do.. | 37 | 425 | 440 | 240 | ..do.. | 89,000 | 0 |
| 15 | 235 | 8 | 1 | 100 | 16 | NaOCH$_2$OC$_{10}$H$_7$ | ..do.. | 28 | 415 | 425 | 200 | ..do.. | 81,000 | 0 |
| 16 | 235 | 8 | 3 | 150 | 8 | Mg(OC$_2$H$_5$)$_2$ | Diethyl ether | 30 | 400 | 420 | 260 | ..do.. | 77,000 | 0 |
| 17 | 260 | 4 | 3 | 200 | 3 | LiOC$_8$H$_{16}$NO$_2$ | ..do.. | 31 | 375 | 400 | 235 | ..do.. | 65,000 | 0 |

[1] Polymerization termination.
[2] Percent high molecular weight polymer mixture recovered.
[3] Percent Cl in final polymer mixture.
S.P. = Softening point.
M.W. = Molecular weight.

EXAMPLE 8

(*Comparative*)

200 parts of phosphonitrilic chloride trimer, previously recrystallized from n-heptane, are degassed, sealed in a suitable reaction vessel and heated to 250° C. for 139 hours. At the end of this time, the polymerization is substantially complete as indicated by the formation of an insoluble polymer mixture of a gel-like consistency. The product is a mixture of polymers which is insoluble in substantially all organic solvents. 200 parts of the insoluble polymer mixture are ground up in a Waring blendor with 2000 parts of benzene to form a colloidal suspension. To this suspension are added 380 parts of phenol and 363 parts of triethylamine. The resulting mixture is transferred to a suitable reaction vessel and refluxed for 8 days with the further addition of 100 parts of triethylamine over this period of time. The resulting reaction mixture is then filtered to recover the triethylamine hydrochloride (375 parts). The remaining benzene filtrate is evaporated to crystallized phosphonitrilic chloride trimer are degassed and completely polymerized to an insoluble polymeric mixture. 200 parts of the insoluble polymer mixture are then blended with 2500 parts of toluene in a Waring blendor to form a colloidal mixture to which are then added 343 parts of 1,1,1-trifluoroethanol and 354 parts of triethylamine. The resulting mixture is then refluxed for 32 hours, cooled to room temperature and stirred at said temperature for an additional 64 hours. A polymeric mixture precipitates and 700 parts of tetrahydrofuran are then added to the reaction mixture. The mixture is then stirred at room temperature for 50 hours and an additional 106 parts of triethylamine and 102 parts of 1,1,1-trifluoroethanol are added. The resulting mixture is then refluxed for 24 hours, cooled to room temperature and stirred at said temperature for an additional 48 hours. The resulting reaction media is then filtered and 549 parts of a solid filter cake is recovered. The cake is washed with water to remove all triethylamine hydrochloride therefrom and 170 parts of a residual mixture of 1,1,1-trifluoroethoxy polymeric material is recovered. The polymer mixture is dried and upon analysis is found to contain 2.09% of chlorine. The polymeric mixture hydrolyzes when contacted with water at about 100° C.

We claim:

1. A process for the production of a thermally stable, water-resistant polymeric mixture which comprises thermally polymerizing a compound having the formula $$(NPCl_2)_m$$

wherein $m$ is a whole, positive integer of from 3 to 4, inclusive, at a temperature ranging from about 200° C. to about 300° C. for a corresponding length of time ranging from about 48 hours to 30 minutes, terminating said thermal polymerization before gelation of the resulting polymer mixture, contacting said resulting polymer mixture with a metal compound having the formula $$M(OR)_x$$

wherein M is a metal selected from the group consisting of lithium, sodium, potassium, magnesium and calcium, $x$ is equal to the valence of metal M, and R is selected from the group consisting of an alkyl radical, an aryl radical, a substituted alkyl radical and a substituted aryl radical, the substituents being selected from the group consisting of halogen, nitro, cyano, alkoxy and aryloxy radicals, at a temperature ranging from about 25° C. to about 200° C. and a corresponding length of time ranging from about 7 days to 3 hours, to produce a mixture of esterified phosphonitrilic polymers having the formula $$[NP(OR)_2]_n$$

wherein R is as specified above and $n$ ranges between about 5 and about 1500, fractionally precipitating said mixture of phosphonitrilic polymers with a material which is a nonsolvent for the polymers wherein $n$ is at least 350 and a solvent for the remaining polymers and recovering the resultant insoluble, thermally stable, water-resistant polymeric mixture.

2. A method according to claim 1 wherein $m$ is 3.
3. A method according to claim 1 wherein $m$ is 4.
4. A method according to claim 1 wherein said metal compound is sodium 1,1,1-trifluoroethoxide.
5. A method according to claim 1 wherein said metal compound is sodium phenoxide.
6. A method according to claim 1 wherein said metal compound is sodium methoxide.

References Cited

UNITED STATES PATENTS

| 2,214,769 | 9/1940 | Lipkin | 260—2 |
| 3,194,787 | 7/1965 | Redfarn et al. | 260—2 |
| 3,271,330 | 9/1966 | Evans | 260—2 |

FOREIGN PATENTS

| 878,324 | 9/1961 | Great Britain. |

OTHER REFERENCES

Brown: "Journal of Polymer Science," vol. V, No. 4, pp. 465-471 (1950).

Goldschmidt et al.: "Journal of Polymer Science," vol. 3, No. 4 (1948), pp. 481–485.

SAMUEL H. BLECH, *Primary Examiner.*